United States Patent
Komine et al.

(12) 
(10) Patent No.: US 11,643,701 B2
(45) Date of Patent: May 9, 2023

(54) HIGH-STRENGTH HOT-DIP GALVANIZED STEEL SHEET AND MANUFACTURING METHOD THEREFOR

(71) Applicant: JFE Steel Corporation, Tokyo (JP)

(72) Inventors: Shinsuke Komine, Tokyo (JP); Tatsuya Nakagaito, Tokyo (JP); Kentaro Sato, Tokyo (JP); Tomohiro Sakaidani, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 0 days.

(21) Appl. No.: 17/425,096

(22) PCT Filed: Oct. 18, 2019

(86) PCT No.: PCT/JP2019/041005
§ 371 (c)(1),
(2) Date: Jul. 22, 2021

(87) PCT Pub. No.: WO2020/158063
PCT Pub. Date: Aug. 6, 2020

(65) Prior Publication Data
US 2022/0106662 A1    Apr. 7, 2022

(30) Foreign Application Priority Data

Jan. 29, 2019    (JP) .............................. JP2019-013074

(51) Int. Cl.
| | | |
|---|---|---|
| *C21D 9/46* | (2006.01) | |
| *B32B 15/01* | (2006.01) | |
| *C21D 6/00* | (2006.01) | |
| *C21D 8/02* | (2006.01) | |
| *C22C 38/00* | (2006.01) | |
| *C23C 2/06* | (2006.01) | |
| *C23C 2/40* | (2006.01) | |
| *C22C 38/02* | (2006.01) | |
| *C22C 38/06* | (2006.01) | |
| *C22C 38/42* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |
| *C22C 38/58* | (2006.01) | |

(52) U.S. Cl.
CPC .............. *C21D 9/46* (2013.01); *B32B 15/013* (2013.01); *C21D 6/004* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C22C 38/001* (2013.01); *C22C 38/002* (2013.01); *C22C 38/005* (2013.01); *C22C 38/02* (2013.01); *C22C 38/06* (2013.01); *C22C 38/42* (2013.01); *C22C 38/44* (2013.01); *C22C 38/46* (2013.01); *C22C 38/48* (2013.01); *C22C 38/50* (2013.01); *C22C 38/54* (2013.01); *C22C 38/58* (2013.01); *C23C 2/06* (2013.01); *C23C 2/40* (2013.01); *C21D 2211/001* (2013.01); *C21D 2211/005* (2013.01); *C21D 2211/008* (2013.01)

(58) Field of Classification Search
None
See application file for complete search history.

(56) References Cited

U.S. PATENT DOCUMENTS

| | | | |
|---|---|---|---|
| 8,480,819 B2 | 7/2013 | Futamura | |
| 9,322,088 B2 | 4/2016 | Mizuta et al. | |
| 10,190,186 B2 | 1/2019 | Hasegawa et al. | |
| 10,895,002 B2 | 1/2021 | Nakano et al. | |
| 2013/0167980 A1 | 7/2013 | Kawata et al. | |
| 2019/0185954 A1* | 6/2019 | Kohsaka | C23C 2/02 |
| 2019/0218652 A1 | 7/2019 | Haga et al. | |

FOREIGN PATENT DOCUMENTS

| | | |
|---|---|---|
| CN | 101765672 A | 6/2010 |
| CN | 101821419 A | 9/2010 |
| CN | 103097566 A | 5/2013 |
| EP | 2175043 A1 | 4/2010 |
| EP | 2202327 A1 | 6/2010 |
| EP | 3473741 A1 | 4/2019 |
| EP | 3712284 A1 | 9/2020 |

(Continued)

OTHER PUBLICATIONS

Korean Office Action for Korean Application No. 10-2021-7023392, dated Oct. 6, 2022, with Concise Statement of Relevance of Office Action 6 pages.

(Continued)

*Primary Examiner* — Alexandra M Moore
(74) *Attorney, Agent, or Firm* — RatnerPrestia

(57) ABSTRACT

The high-strength hot-dip galvanized steel sheet, which includes a hot-dip galvanized coating layer on a surface of the steel sheet, has a component composition containing, in mass %, C: 0.07% to 0.20%, Si: 0.1% to 2.0%, Mn: 2.0% to 3.5%, P: 0.05% or less, S: 0.05% or less, and sol. Al: 0.005% to 0.1%, with the balance being Fe and incidental impurities; and has a steel microstructure containing, in area fraction, 60% or less of ferrite, 40% or more of tempered martensite, and 10% or less of fresh martensite and having a void number density of 1,500/mm$^2$ or less in a bent portion in the VDA bending test.

12 Claims, No Drawings

(56) References Cited

FOREIGN PATENT DOCUMENTS

| | | | |
|---|---|---|---|
| JP | 2011157583 | A | 8/2011 |
| JP | 2012031462 | A | 2/2012 |
| JP | 2015175061 | A | 10/2015 |
| JP | 2017115238 | A | 6/2017 |
| JP | 6338038 | B1 | 6/2018 |
| WO | 2014092025 | A1 | 6/2014 |
| WO | 2018043453 | A1 | 3/2018 |
| WO | 2018073919 | A1 | 4/2018 |
| WO | 2018138898 | A1 | 8/2018 |
| WO | 2018234839 | A1 | 12/2018 |

OTHER PUBLICATIONS

Chinese Office Action with Search Report for Chinese Application No. 201980090428.0, dated Jul. 19, 2022, 10 pages.
Extended European Search Report for European Application No. 19 913 827.2, dated Dec. 7, 2021, 10 pages.
International Search Report and Written Opinion for International Application No. PCT/JP2019/041005, dated Jan. 21, 2020, 6 pages.

\* cited by examiner

HIGH-STRENGTH HOT-DIP GALVANIZED STEEL SHEET AND MANUFACTURING METHOD THEREFOR

CROSS REFERENCE TO RELATED APPLICATIONS

This is the U.S. National Phase application of PCT/JP2019/041005, filed Oct. 18, 2019, which claims priority to Japanese Patent Application No. 2019-013074, filed Jan. 29, 2019, the disclosures of these applications being incorporated herein by reference in their entireties for all purposes.

FIELD OF THE INVENTION

The present invention relates to a high-strength hot-dip galvanized steel sheet that is suitable for uses as an automotive steel sheet and is excellent in fracture resistance characteristics in a crash and to a manufacturing method therefor.

BACKGROUND OF THE INVENTION

To reduce $CO_2$ emission for global environmental protection, it has always been an important challenge in the automobile industry to reduce the weight of an automobile body while maintaining the strength, thereby improving automobile fuel efficiency. To reduce the weight of an automobile body while maintaining the strength, it is effective to make a steel sheet as a raw material for an automotive part thin by increasing the strength. Meanwhile, ensuring the safety of occupants in a crash is a prerequisite for an automotive part made of a steel sheet. Accordingly, excellent crash characteristics, in addition to desirable strength, are required for a high-strength steel sheet used as a raw material for an automotive part.

In recent years, a high-strength steel sheet of over 980 MPa grade in tensile strength TS has been increasingly applied to an automobile body. In light of crash characteristics, automotive parts are broadly classified into energy absorbing members and non-deformable members, such as a pillar and a bumper. The respective members are required to have crash characteristics necessary for ensuring the safety of passengers in case of a crash during driving. In non-deformable members, the strength has already been increased to achieve the practical use of a high-strength steel sheet of over 980 MPa grade. Meanwhile, for the application to energy absorbing members, there is a problem in which a high-strength steel sheet of over 980 MPa grade tends to cause fracture of members in a crash since a portion that has been subjected to primary processing during forming acts as a starting point of fracture and consequently cannot exhibit crash energy absorbing capability in a stable manner. For this reason, a high-strength steel sheet of 980 MPa grade or higher has not yet been applied to energy absorbing members and thus there is a room for contribution to environmental protection through weight reduction. Accordingly, there is a need for applying a high-strength steel sheet of over 980 MPa grade that is excellent in fracture resistance characteristics to energy absorbing members.

As for such a need, Patent Literature 1, for example, discloses a technique related to an ultra-high-strength steel sheet of 1,180 MPa grade in TS that is excellent in formability and impact resistance. Moreover, Patent Literature 2 discloses a technique related to a high-strength steel sheet that has a maximum tensile strength of 780 MPa or more and that is applicable to impact absorbing members in a crash.

PATENT LITERATURE

PTL 1: Japanese Unexamined Patent Application Publication No. 2012-31462

PTL 2: Japanese Unexamined Patent Application Publication No. 2015-175061

SUMMARY OF THE INVENTION

Although crash characteristics have been examined as impact resistance on the premise that a member does not fracture in a crash, Patent Literature 1 has not examined crash characteristics in terms of fracture resistance of a member. Meanwhile, Patent Literature 2 has observed a crack in each hat member in a dynamic axial crush test using a drop weight to evaluate fracture resistance characteristics for over 780 MPa grade. However, it is impossible to evaluate, from a crack observed after crush, the process from crack initiation leading to fracture during crush. The reasons are as follows. When a crack is formed in the early stage of the crushing process, even a minor crack without penetrating the sheet thickness is likely to lower energy absorption. Moreover, when a crack is formed in the late stage of the crushing process, even a major crack penetrating the sheet thickness is likely to affect energy absorption little. Accordingly, a crack observed after crush alone is considered to be insufficient for the evaluation of fracture resistance characteristics.

Aspects of the present invention were made in view of the above, and an object is to provide a high-strength hot-dip galvanized steel sheet that is suitable as a high-strength steel sheet for an automotive energy absorbing member and that has a tensile strength (TS) of 980 MPa or more and excellent fracture resistance characteristics in a crash and to provide a manufacturing method therefor.

To resolve the above-mentioned problems from the standpoint of the component composition and microstructure of a steel sheet as well as a manufacturing method therefor, the present inventors continued vigorous studies and found the following as a result.

It was found possible to obtain a high-strength hot-dip galvanized steel sheet having a TS of 980 MPa or more and excellent fracture resistance characteristics in a crash by satisfying, in addition to a particular component composition, 60% or less of ferrite, 40% or more of tempered martensite, and 10% or less of fresh martensite in area fraction; and a void number density of $1,500/mm^2$ or less in a bent portion in the VDA bending test.

Aspects of the present invention were made on the basis of these findings and are summarized as follows.

[1] A high-strength hot-dip galvanized steel sheet, which includes a hot-dip galvanized coating layer on a surface of the steel sheet, the steel sheet has a steel composition containing, in mass %, C: 0.07% to 0.20%, Si: 0.1% to 2.0%, Mn: 2.0% to 3.5%, P: 0.05% or less, S: 0.05% or less, and sol. Al: 0.005% to 0.1%, with the balance being Fe and incidental impurities; and a steel microstructure containing, in area fraction, 60% or less of ferrite, 40% or more of tempered martensite, and 10% or less of fresh martensite and having a void number density of $1,500/mm^2$ or less in a bent portion in the VDA bending test.

[2] The high-strength hot-dip galvanized steel sheet according to [1], where the steel microstructure further contains, in area fraction, 3% to 10% of retained austenite.

[3] The high-strength hot-dip galvanized steel sheet according to [1] or [2], where the steel composition further contains, in mass %, one or two or more elements selected from Cr: 0.005% to 1.0%, Mo: 0.005% to 0.5%, and V: 0.005% to 0.5%.

[4] The high-strength hot-dip galvanized steel sheet according to any of [1] to [3], where the steel composition further contains, in mass %, one or two or more elements selected from Ti: 0.005% to 0.5%, Nb: 0.005% to 0.5%, B: 0.0003% to 0.005%, Ni: 0.005% to 1.0%, and Cu: 0.005% to 1.0%.

[5] The high-strength hot-dip galvanized steel sheet according to any of [1] to [4], where the steel composition further contains, in mass %, one or two elements selected from Ca: 0.001% to 0.005% and REM: 0.001% to 0.005%.

[6] The high-strength hot-dip galvanized steel sheet according to any of [1] to [5], where the hot-dip zinc coating layer on the surface of the steel sheet is a galvannealed coating layer.

[7] A method of manufacturing a high-strength hot-dip galvanized steel sheet, including: a hot rolling step of subjecting a steel slab having the steel composition according to any of [1] and [3] to [5] to hot rolling at a finish rolling temperature of 850° C. to 950° C. and coiling at a coiling temperature of 600° C. or lower; a cold rolling step of cold rolling the hot-rolled steel sheet at a reduction exceeding 20%; an annealing step of heating the cold-rolled steel sheet to an annealing temperature of 750° C. or higher and holding for 30 seconds or more; subjecting the annealed steel sheet to a quenching and tempering step which includes cooling at an average cooling rate of 20° C./s or more in a temperature range from the annealing temperature to a martensite start temperature (Ms), cooling at an average cooling rate of 2° C./s to 10° C./s to a cooling stop temperature of (Ms—200° C.) to (Ms—100° C.), and then holding at 300° C. to 500° C. for 20 seconds or more; and a hot-dip galvanizing step of subjecting the quenched and tempered steel sheet to hot-dip galvanizing.

[8] The method of manufacturing a high-strength hot-dip galvanized steel sheet according to [7], where the hot-dip galvanizing step includes an alloying step of subjecting the galvanized steel sheet to an alloying treatment after subjecting to the hot-dip galvanizing.

According to aspects of the present invention, it is possible to obtain a high-strength hot-dip galvanized steel sheet that is suitable as a high-strength steel sheet for an automotive energy absorbing member and that has a tensile strength (TS) of 980 MPa or more and excellent fracture resistance characteristics in a crash.

DETAILED DESCRIPTION OF EMBODIMENTS OF THE INVENTION

Hereinafter, the details of the present invention will be described. Herein, the sign "%" that represents the content of each component element means "mass %" unless otherwise indicated.

1) Steel Composition

C: 0.07% to 0.20%

C facilitates the formation of phases other than ferrite and forms an alloy compound with Nb, Ti, and the like. For these reasons, C is an element necessary for enhancing the strength. When C content is less than 0.07%, it is impossible to ensure a desirable strength even if manufacturing conditions are optimized. Meanwhile, when C content exceeding 0.20% causes to increase martensite, and makes it impossible in some cases to obtain the steel microstructure according to aspects of the present invention even if manufacturing conditions are optimized. Preferably, C content is set to 0.10% or more and 1.8% or less.

Si: 0.1% to 2.0%

Si is a ferrite forming element as well as a solid solution strengthening element. For this reason, Si contributes to improving the balance between strength and ductility. To obtain this effect, Si content needs to be set to 0.1% or more. Meanwhile, Si content exceeding 2.0% causes lowering in adhesion or bonding of a galvanized coating and deterioration in surface quality in some cases. Preferably, Si content is set to 0.2% or more and 1.5% or less.

Mn: 2.0% to 3.5%

Mn is a martensite forming element as well as a solid solution strengthening element. Mn also contributes to stabilizing retained austenite. To obtain these effects, Mn content needs to be set to 2.0% or more. Meanwhile, when Mn content exceeding 3.5% causes to increase a martensite fraction in the secondary phase, and formability deteriorates in some cases. Preferably, Mn content is set to 2.1% or more and 3.0% or less.

P: 0.05% or less

P is an element effective for strengthening steel. However, P content exceeding 0.05% considerably delays an alloying rate. In addition, an excessive content beyond 0.05% causes embrittlement due to grain boundary segregation, thereby impairing fracture resistance characteristics in a crash in some cases. Preferably, P content is set to 0.01% or less. The lower limit, although not particularly specified, is 0.0005% or more in view of economic efficiency in refining.

S: 0.05% or less

S forms an inclusion, such as MnS, to cause deterioration in impact resistance as well as cracking along a metal flow in a weld. Accordingly, the content of S is preferably small as much as possible but is set to 0.05% or less in view of manufacturing costs. Preferably, S content is set to 0.01% or less. The lower limit is not particularly specified but is 0.0001% or more in view of economic efficiency in refining.

Sol. Al: 0.005% to 0.1%

Al acts as a deoxidizer and is a solid solution strengthening element as well. When sol. Al content is less than 0.005%, these effects cannot be obtained. Meanwhile, sol. Al content exceeding 0.1% impairs slab quality in steelmaking. Preferably, sol. Al content is set to 0.005% or more and 0.04% or less.

The foregoing are basic components. The high-strength hot-dip galvanized steel sheet according to aspects of the present invention has a component composition containing the foregoing basic components with the balance being Fe (iron) and incidental impurities. Here, the high-strength hot-dip galvanized steel sheet according to aspects of the present invention preferably has a component composition containing the foregoing basic components with the balance being Fe and incidental impurities. Meanwhile, it is acceptable to contain N as an incidental impurity within a range of 0.0060% or less.

The high-strength hot-dip galvanized steel sheet according to aspects of the present invention may have the above-described component composition optionally further containing one or two or more elements selected from Cr, Mo, and V described below.

Cr: 0.005% to 1.0%, Mo: 0.005% to 0.5%, V: 0.005% to 0.5%

Cr, Mo, and V are elements effective for enhancing hardenability and strengthening steel. The effect is obtained when content of each element is 0.005% or more. Meanwhile, when Cr, Mo, and V are added excessively beyond 1.0%, 0.5%, and 0.5%, respectively, the effect levels off while increasing raw material costs. In addition, the fraction of the secondary phase becomes excessive to impair fracture resistance characteristics in a crash in some cases.

The high-strength hot-dip galvanized steel sheet according to aspects of the present invention may have the above-described component composition further containing one or two or more elements selected from Ti, Nb, B, Ni, and Cu described below.

Ti: 0.005% to 0.5%, Nb: 0.005% to 0.5%

Ti and Nb are effective for precipitation strengthening of steel, and the effect is obtained when content of each element is 0.005% or more. Within the specified ranges according to aspects of the present invention, these elements may be used for strengthening steel. Meanwhile, when content of each element exceeds 0.5%, fracture resistance characteristics in a crash deteriorate in some cases.

B: 0.0003% to 0.005%

B contributes to enhancing hardenability by suppressing the formation and/or growth of ferrite from austenite grain boundaries. For this reason, B may be added as necessary. The effect is obtained at a content of 0.0003% or more. Meanwhile, when B content exceeds 0.005%, fracture resistance characteristics in a crash deteriorate in some cases.

Ni: 0.005% to 1.0%, Cu: 0.005% to 1.0%

Ni and Cu are elements effective for strengthening steel and may be used within the ranges specified in accordance with aspects of the present invention for strengthening steel. To obtain the effect, each element is preferably contained at 0.005% or more. Meanwhile, when content of Ni and Cu each exceed 1.0%, fracture resistance characteristics in a crash deteriorate in some cases.

The high-strength hot-dip galvanized steel sheet according to aspects of the present invention may have the above-described component composition optionally further containing one or two elements selected from Ca and REM described below.

Ca: 0.001% to 0.005%, REM: 0.001% to 0.005%

Both Ca and REM are elements effective for improving workability through shape control of a sulfide. To obtain this effect, content of each of Ca and REM is preferably set to 0.001% or more. Meanwhile, when content of each of Ca and REM exceeds 0.005%, there is a risk of adversely affecting the cleanliness of steel and thus impairing the characteristics.

2) Steel Microstructure

Area Fraction of Ferrite: 60% or Less

When the area fraction of ferrite exceeds 60%, it is difficult to attain both a TS of 980 MPa or more and excellent fracture resistance characteristics in a crash. Accordingly, the area fraction of ferrite is set to 60% or less and preferably set to 40% or less. The lower limit of the area fraction is not particularly specified but is preferably 10% or more.

Area Fraction of Tempered Martensite: 40% or More

Tempered martensite is effective for improving fracture resistance characteristics in a crash. When the area fraction of tempered martensite is less than 40%, this effect cannot be obtained satisfactorily. Preferably, the area fraction is set to 50% to 80%.

Area Fraction of Fresh Martensite: 10% or Less

Fresh martensite is effective for increasing strength. However, voids are readily formed in grain boundaries between fresh martensite and a soft phase. When the area fraction of fresh martensite exceeds 10%, fracture resistance characteristics in a crash deteriorate in some cases. Preferably, the area fraction is set to 5% or less. The lower limit of the area fraction is not particularly specified but is preferably 1% or more.

Void Number Density in Bent Portion in VDA Bending Test: 1,500/mm$^2$ or Less

In the high-strength hot-dip galvanized steel sheet according to aspects of the present invention, excellent crash resistance characteristics are attained by satisfying a void number density of 1,500/mm$^2$ or less in a bent portion in the VDA bending test. The mechanism of this phenomenon is unclear but is presumably as follows. Fracture in a crash, which causes deterioration in crash resistance characteristics, originates from the initiation and propagation of a crack. The initiation of a crack is considered to be facilitated by lowering in work hardenability and by formation and joining of voids observed within the steel sheet microstructure in a region of a large difference in hardness. Moreover, in a crash of an actual member, the member deforms such that a portion that has been subjected to primary processing is bent back in a direction orthogonal to the primary processing. On this occasion, if a void is formed in a region of a large difference in hardness due to the primary processing, stress is concentrated around the void to promote the initiation and propagation of a crack, thereby resulting in fracture. Meanwhile, a region of a large difference in hardness may be reduced by utilizing tempered martensite, and stress concentration during deformation in a portion that has been subjected to primary processing may be suppressed by utilizing retained austenite if necessary. Consequently, it is possible to suppress the initiation and propagation of a crack in the portion that has been subjected to primary processing as well as the resulting fracture of a member, thereby attaining excellent fracture resistance characteristics. To obtain these effects, the void number density in a bent portion in the VDA bending test is set to 1,500/mm$^2$ or less and preferably 1,000/mm$^2$ or less.

Regarding the void number density in a bent portion in the VDA bending test, it is possible to obtain a desirable void number density by controlling the cooling rate after annealing described hereinafter. In a high-temperature range, ferrite transformation during cooling is suppressed without lowering Ms by a fast cooling rate. In a temperature range of Ms or lower, martensite is tempered during cooling as well by slowing down the cooling rate. Through further tempering by the subsequent reheating, martensite is thoroughly tempered to further greatly contribute to reducing a difference in hardness. Consequently, formation of voids during primary processing is suppressed.

Herein, the void number density in a bent portion in the VDA bending test is the number of voids observed within a steel sheet microstructure by metallographic observation of the bent portion after the primary processing (after primary bending) in the bending-orthogonal bending test (VDA bending test) in accordance with the VDA standard (VDA 238-100) specified by the German Association of the Automotive Industry. As a measuring method according to aspects of the present invention for the void number density in a bent portion in the VDA bending test, the void number density in a bent portion is measured in accordance with the VDA standard by carrying out metallographic observation of a test piece that has been subjected to a primary bending using a 90 degree V-block under the following conditions.

[Primary Bending Conditions]
Punch tip radius: 5 mm
Forming load: 15 ton
Stroke rate: 30 mm/min
Holding time: 5 seconds Bending direction: direction parallel to rolling
[Orthogonal Bending Conditions]
Test method: roll support, punching
Roll diameter ⌀30 mm
Punch tip radius: 0.4 mm
Roll spacing: (sheet thickness×2)+0.5 mm
Stroke rate: 20 mm/min
Test piece size: 60 mm×60 mm
Bending direction: direction orthogonal to rolling As for the void number density, a portion that had been subjected to the primary processing was cut orthogonal to the rolling direction; the resulting cross-section in the sheet thick direction was polished; three fields of view were imaged under an SEM (scanning electron microscope) at a magnification of 1,500× for a surface layer in the sheet thickness direction on the inner side in bending during the primary processing; each void number density was obtained from the resulting image data by using Image-Pro from Media Cybernetics, Inc.; and an average of the number densities for the three fields of view was regarded as the void number density. Voids have black color darker than ferrite and are clearly distinguishable from each microstructure.

Area Fraction of Retained Austenite: 3% to 10% (Preferable Condition)

Retained austenite is effective for delaying crack initiation in a crash and improving fracture resistance characteristics. When the area fraction of retained austenite is less than 3%, such an effect cannot be obtained. Meanwhile, when the area fraction of retained austenite exceeds 10%, fracture resistance characteristics in a crash deteriorate in some cases due to fresh martensite formed through strain-induced transformation. More preferably, the area fraction is set to 5% to 10%.

Bainite, cementite, and/or pearlite may be contained at 5% or less in total in some cases as microstructures excluding ferrite, tempered martensite, fresh martensite, and retained austenite. As long as the above-described conditions for the steel microstructure are satisfied, the object according to aspects of the present invention is attained.

Herein, each area fraction of ferrite, fresh martensite, and tempered martensite indicates the area ratio of each phase relative to an observed area. As for the area fraction of each microstructure, a steel sheet was cut orthogonal to the rolling direction; the resulting cross-section in the sheet thick direction was polished and then etched with 3 mass % nital; three fields of view were imaged at the ¼ position in the sheet thickness direction under an SEM (scanning electron microscope) at a magnification of 1,500×; the area fraction of each microstructure was obtained from the resulting image data by using Image-Pro from Media Cybernetics, Inc.; and an average of the area fractions for the three fields of view was regarded as the area fraction of each microstructure. In the image data, each microstructure is distinguishable as black for ferrite, light grey containing randomly aligned fine carbides for tempered martensite, and white for retained austenite and fresh martensite. Moreover, the volume fraction of retained austenite is a ratio of, on the ¼ plane in the sheet thickness direction, X-ray diffraction integrated intensities for (200), (220), and (311) planes of fcc iron to X-ray diffraction integrated intensities for (200), (211), and (220) planes of bcc iron. Since fresh martensite and retained austenite are difficult to distinguish on an SEM image, the area fraction of fresh martensite is obtained by subtracting the area fraction of retained austenite from the total area fraction of fresh martensite and retained austenite.

Further, the hot-dip zinc coating layer on the surface of the steel sheet according to aspects of the present invention is preferably a galvannealed coating layer. The term "surface" specified in accordance with aspects of the present invention means the interface between the coating layer and the steel sheet.

3) Manufacturing Conditions

A method of manufacturing a high-strength steel sheet according to aspects of the present invention is characterized by including: a hot rolling step of subjecting a steel slab having the above-described steel composition to hot rolling at a finish rolling temperature of 850° C. to 950° C. and coiling at a coiling temperature of 600° C. or lower; a cold rolling step of cold rolling at a reduction exceeding 20%; an annealing step of heating to an annealing temperature of 750° C. or higher and holding for 30 seconds or more; a quenching and tempering step of cooling at an average cooling rate of 20° C./s or more in a temperature range from the annealing temperature to a martensite start temperature (Ms), cooling at an average cooling rate of 2° C./s to 10° C./s to a cooling stop temperature of (Ms—200° C.) to (Ms—100° C.), and then holding at 300° C. to 500° C. for 20 seconds or more; and a hot-dip galvanizing step of subjecting to hot-dip galvanizing. Moreover, the hot-dip galvanizing step may include an alloying step of subjecting to an alloying treatment after subjecting to the hot-dip galvanizing.

First, the respective conditions in the hot rolling step will be described.

Finish Rolling Temperature: 850° C. to 950° C.

When the finish rolling temperature is lower than 850° C., ferrite transformation occurs during rolling to lower the strength locally. Consequently, it is impossible to attain the microstructure and characteristics according to aspects of the present invention. Meanwhile, when the finish rolling temperature exceeds 950° C., crystal grains coarsen. Consequently, it is impossible to obtain the steel microstructure according to aspects of the present invention. Accordingly, the finish rolling temperature is set to 850° C. to 950° C.

Coiling Temperature: 600° C. or Lower

When the coiling temperature exceeds 600° C., carbides in a hot-rolled sheet coarsen. Since such coarsened carbides do not dissolve completely during soaking in annealing, a required strength cannot be attained in some cases.

A hot-rolled sheet obtained in the hot rolling step is subjected to preliminary treatment, such as pickling or degreasing, by a publicly known common method and subsequently to cold rolling as necessary. The conditions for the cold rolling step, when subjected to cold rolling, will be described.

Reduction in Cold Rolling: More Than 20%

When the reduction in cold rolling is 20% or less, recrystallization of ferrite is not promoted to leave non-recrystallized ferrite, thereby impairing workability in some cases.

Next, the conditions for the annealing step of annealing a cold-rolled sheet obtained in the cold rolling step will be described.

Annealing Temperature: 750° C. or Higher, Holding Time: 30 Seconds or More

When the annealing temperature is lower than 750° C., the steel microstructure according to aspects of the present invention cannot be obtained since austenite is formed insufficiently while forming excessive ferrite. Preferably, the annealing temperature is set to 750° C. to 900° C. Moreover, when the holding time is less than 30 seconds, the steel microstructure according to aspects of the present invention cannot be obtained since austenite is formed insufficiently while forming excessive ferrite. Preferably, the holding time is set to 30 seconds or more and 600 seconds or less.

After the annealing step, the steel sheet is subjected to quenching and tempering. The conditions for the quenching and tempering step will be described.

Average Cooling Rate in Temperature Range from Annealing Temperature to Martensite Start Temperature (Ms): 20° C./s or More When an average cooling rate for the steel sheet after annealing at the above-mentioned annealing temperature is less than 20° C./s in a temperature range from the annealing temperature to the martensite start temperature (Ms), the fracture resistance characteristics according to aspects of the present invention cannot be attained. The reason is unclear but is presumably as follows. When the cooling rate is less than 20° C./s, ferrite and/or bainite are formed excessively during cooling, thereby lowering the Ms. For this reason, the amount of martensite transformation decreases when cooling is stopped. Moreover, since martensite transformation occurs at a lower temperature, martensite is tempered insufficiently during cooling compared with a case of higher Ms. It is considered, as a result, that the effect of reducing a difference in hardness by tempered martensite diminishes, thereby readily forming voids during primary processing. Accordingly, the average cooling rate is set to 20° C./s or more.

Here, Ms can be obtained by the following formula.

Ms (° C.)=539−423×{[C %]×100/(100−[area % of α])}−30×[Mn %]−12×[Cr %]−18×[Ni %]−8×[Mo %]

where each element symbol represents the content (mass %) of each element, and any element, if not contained, is set to zero.

Further, [area % of α] represents the area fraction of ferrite during annealing. The area fraction of ferrite during annealing is obtained in advance using a thermal expansion meter by simulating a temperature rising rate, an annealing temperature, and a holding time during annealing.

After annealing, it is preferable to cool rapidly at a cooling rate as fast as possible. Accordingly, the average cooling rate in the temperature range from the annealing temperature to the martensite start temperature (Ms) is preferably 22° C./s or more. The average cooling rate in the temperature range from the annealing temperature to the martensite start temperature (Ms) is more preferably 50° C./s or more. Meanwhile, in view of the economic efficiency of cooling facilities, the average cooling rate is preferably set to 100° C./s or less.

Average Cooling Rate to Cooling Stop Temperature of (Ms—200° C.) to (Ms—100° C.): 2° C./s to 10° C./s When the average cooling rate is less than 2° C./s, bainite containing carbides are excessively formed during cooling. Consequently, the steel microstructure according to aspects of the present invention cannot be obtained. Meanwhile, when cooling is performed at an average cooling rate exceeding 10° C./s, the fracture resistance characteristics according to aspects of the present invention cannot be attained. The reason is unclear but is presumably as follows. By setting the cooling rate to 10° C./s or less, the time it takes to reach a cooling stop temperature from the Ms increases. It is considered, as a result, that martensite is tempered during cooling as well, thereby further effectively reducing a difference in hardness by tempered martensite. Meanwhile, it is considered that such effects cannot be obtained when the cooling rate exceeds 10° C./s, thereby readily forming voids during primary processing. Accordingly, the average cooling rate is set to 2° C./s to 10° C./s.

Cooling Stop Temperature: (Ms—200° C.) to (Ms—100° C.)

When the cooling stop temperature exceeds (Ms—100° C.), the steel microstructure according to aspects of the present invention cannot be obtained since tempered martensite is formed insufficiently. Meanwhile, when the cooling stop temperature is lower than (Ms—200° C.), retained austenite is formed insufficiently in some cases due to excessive tempered martensite. Preferably, the cooling stop temperature is set to (Ms—200° C.) to (Ms—150° C.)

Tempering Temperature: 300° C. to 500° C., Holding Time: 20 Seconds or More

When the tempering temperature is lower than 300° C., the fracture resistance characteristics and steel microstructure according to aspects of the present invention cannot be attained since martensite is tempered insufficiently. Meanwhile, when the tempering temperature exceeds 500° C., the steel microstructure according to aspects of the present invention cannot be obtained since ferrite is formed excessively. Preferably, the tempering temperature is set to 350° C. or higher and 450° C. or lower. Moreover, when the holding time is less than 20 seconds, the fracture resistance characteristics and steel microstructure according to aspects of the present invention cannot be attained since martensite is tempered insufficiently. Preferably, the holding time is set to 30 seconds or more and 500 seconds or less.

Next, the conditions for the hot-dip galvanizing step will be described.

Hot-dip galvanizing is preferably performed by immersing a steel sheet obtained as in the foregoing in a zinc bath at 440° C. or higher and 500° C. or lower and then adjusting the coating weight by gas wiping or the like. The hot-dip galvanizing step may be followed by an alloying step of subjecting to an alloying treatment.

A steel sheet that has been subjected to hot-dip galvanizing or galvannealing may undergo skin-pass rolling for the purpose of shape correction, adjustment of surface roughness, or the like. However, when the reduction in skin-pass rolling exceeds 0.5%, bendability deteriorates in some cases due to hardening of the surface layer. Accordingly, the reduction is set to preferably 0.5% or less and more preferably 0.3% or less. Further, the steel sheet may also be subjected to treatment with various coatings, such as resin and grease coatings.

Other conditions for the manufacturing method are not particularly limited, but the following conditions are preferable.

To prevent macrosegregation, a slab is preferably manufactured by a continuous casting method and may also be manufactured by an ingot casting method or a thin slab casting method. For hot rolling a slab, a slab may be cooled once to room temperature, then reheated, and subjected to hot rolling. Moreover, a slab may also be charged into a heating furnace without cooling to room temperature and subjected to hot rolling. Alternatively, an energy-saving process of hot rolling immediately after short-time heating and holding may also be employed. When heating a slab, it is preferable to heat to 1,100° C. or higher from a viewpoint of preventing an increase in rolling load and dissolving carbides. Meanwhile, to prevent an increase in scale loss, a heating temperature of a slab is preferably set to 1,300° C. or lower.

When hot rolling a slab, a sheet bar after rough rolling may be heated from a viewpoint of preventing trouble during rolling associated with a low heating temperature of the slab. Moreover, a so-called continuous rolling process of joining sheet bars and continuously subjecting to finish rolling may be employed. Further, for reduced rolling load and uniform shape and/or quality, rolling with lubrication at a friction coefficient of 0.10 to 0.25 is preferably performed in all or part of the passes in finish rolling.

Scale may be removed from a steel sheet after coiling by pickling or the like. After pickling, the steel sheet is subjected to cold rolling, annealing, and hot-dip galvanizing under the above-described conditions.

EXAMPLES

Each steel having the component composition shown in Table 1 was refined in a vacuum melting furnace and rolled into a steel slab. In Table 1, N is an incidental impurity.

TABLE 1

| | Component composition (mass %) | | | | | | | | | | | | | | | | |
|---|---|---|---|---|---|---|---|---|---|---|---|---|---|---|---|---|---|
| Steel | C | Si | Mn | P | S | Al | N | Cr | Mo | V | Ti | Nb | B | Ni | Cu | Others | Note |
| A | 0.12 | 0.7 | 2.7 | 0.008 | 0.0014 | 0.031 | 0.003 | 0.11 | — | — | 0.012 | 0.018 | 0.0015 | — | — | — | Example |
| B | 0.13 | 1.5 | 2.4 | 0.006 | 0.0012 | 0.029 | 0.001 | 0.59 | — | — | — | 0.007 | — | — | — | — | Example |
| C | 0.13 | 0.8 | 2.2 | 0.004 | 0.0016 | 0.031 | 0.002 | — | 0.06 | — | 0.015 | — | 0.0003 | — | — | — | Example |
| D | 0.17 | 0.1 | 2.1 | 0.009 | 0.0013 | 0.029 | 0.002 | 0.42 | — | — | 0.021 | — | 0.0011 | — | — | Ca: 0.002, REM: 0.002 | Example |
| E | 0.19 | 0.2 | 1.7 | 0.008 | 0.0016 | 0.025 | 0.004 | — | 0.13 | — | 0.011 | 0.011 | 0.0015 | — | 0.2 | — | Example |
| F | 0.11 | 1.7 | 2.6 | 0.009 | 0.0013 | 0.023 | 0.003 | 0.56 | — | — | 0.022 | — | 0.0012 | 0.49 | — | REM: 0.003 | Example |
| G | 0.15 | 0.5 | 2.6 | 0.005 | 0.0016 | 0.026 | 0.001 | — | 0.11 | — | 0.016 | — | 0.0015 | — | — | — | Example |
| H | <u>0.22</u> | 0.1 | 2.5 | 0.009 | 0.0015 | 0.022 | 0.001 | — | 0.14 | — | 0.013 | — | 0.0018 | — | — | — | Comparative Example |
| I | <u>0.06</u> | 0.3 | 2.8 | 0.007 | 0.0012 | 0.031 | 0.002 | 0.49 | — | — | 0.016 | 0.022 | 0.0011 | — | — | — | Comparative Example |
| J | 0.13 | <u>2.2</u> | 2.2 | 0.008 | 0.0015 | 0.031 | 0.001 | 0.51 | — | — | 0.019 | — | 0.0012 | — | — | Ca: 0.002, REM: 0.003 | Comparative Example |
| K | 0.11 | 0.5 | <u>1.2</u> | 0.006 | 0.0012 | 0.033 | 0.002 | 0.23 | — | — | — | — | 0.0019 | — | — | Ca: 0.002 | Comparative Example |
| L | 0.14 | 0.4 | <u>3.3</u> | 0.009 | 0.0012 | 0.021 | 0.004 | <u>1.12</u> | — | — | 0.015 | — | 0.0009 | — | — | REM: 0.003 | Comparative Example |
| M | 0.16 | 0.5 | 2.2 | 0.011 | 0.0013 | 0.022 | 0.003 | — | <u>0.71</u> | — | 0.014 | — | — | — | — | — | Comparative Example |
| N | 0.17 | 0.2 | 2.5 | 0.007 | 0.0014 | 0.028 | 0.002 | — | — | <u>0.811</u> | — | — | — | 0.41 | — | — | Comparative Example |
| O | 0.09 | 1.5 | 2.1 | 0.006 | 0.0018 | 0.026 | 0.002 | 0.63 | — | — | <u>0.653</u> | — | 0.0013 | — | 0.3 | — | Comparative Example |
| P | 0.15 | 0.4 | 2.7 | 0.008 | 0.0012 | 0.024 | 0.002 | 0.61 | — | — | 0.016 | <u>0.702</u> | 0.0015 | — | — | — | Comparative Example |
| Q | 0.19 | 0.2 | 1.9 | 0.011 | 0.0008 | 0.031 | 0.003 | — | — | 0.032 | 0.018 | — | <u>0.6985</u> | — | — | — | Comparative Example |

Underlines indicate the outside of the scope of the invention

Each of these steel slabs was heated and then subjected to rough rolling, finish rolling, and coiling to yield a hot-rolled sheet. Subsequently, the hot-rolled sheet was cold-rolled into a cold-rolled sheet, and the resulting cold-rolled sheet was subjected to annealing. The hot rolling conditions, cold rolling conditions, and annealing conditions are as shown in Table 2. Each steel sheet prepared under the conditions shown in Table 2 was immersed in a coating bath to form a hot-dip galvanized coating layer (GI) at a coating weight of 20 to 80 g/m². Further, some steel sheets were subjected to an alloying treatment after forming a hot-dip galvanized layer to yield galvannealed steel sheets (GA).

TABLE 2

| | | Hot rolling conditions | | Cold rolling conditions | Annealing conditions | | Quenching and Tempering conditions | |
|---|---|---|---|---|---|---|---|---|
| Steel sheet No. | Steel | Finish rolling temperature (° C.) | Coiling temperature (° C.) | Reduction (%) | Annealing temperature (° C.) | Annealing holding time (s) | Average cooling rate from annealing temperature to Ms (° C./s) | Ms (° C.) |
| 1 | A | 880 | 520 | 50 | 800 | 100 | 25 | 360 |
| 2 | | 870 | 510 | 50 | 830 | 100 | 28 | 370 |
| 3 | | 880 | 500 | 50 | 770 | 90 | 22 | 350 |
| 4 | | 860 | 550 | 55 | 820 | 150 | 31 | 340 |
| 5 | | 890 | 530 | 55 | 800 | 40 | 27 | 340 |
| 6 | | 880 | 480 | 55 | 880 | 80 | 33 | 350 |
| 7 | | 870 | 500 | 60 | 800 | 90 | 23 | 360 |
| 8 | | 910 | 510 | 65 | 820 | 100 | 23 | 360 |
| 9 | | <u>820</u> | 500 | 50 | 760 | 100 | <u>15</u> | 340 |
| 10 | B | 860 | 500 | 50 | 800 | 90 | 41 | 340 |
| 11 | | 870 | 560 | 65 | 890 | 80 | 23 | 380 |
| 12 | | 900 | <u>620</u> | 65 | 860 | 80 | 21 | 380 |
| 13 | | 870 | 530 | <u>15</u> | 820 | 100 | 26 | 350 |
| 14 | C | 940 | 510 | 60 | 840 | 90 | 23 | 360 |
| 15 | | 910 | 540 | 55 | 780 | 100 | 21 | 220 |
| 16 | | 860 | 560 | 50 | 830 | <u>10</u> | 37 | 220 |
| 17 | D | 880 | 570 | 50 | 820 | 100 | 25 | 330 |
| 18 | | 890 | 520 | 50 | 800 | 80 | 27 | 340 |
| 19 | E | 880 | 520 | 50 | 890 | 40 | 31 | 390 |
| 20 | | 870 | 510 | 50 | 810 | 80 | 22 | 370 |
| 21 | | 880 | 500 | 50 | <u>720</u> | 200 | 23 | 290 |
| 22 | F | 890 | 520 | 55 | 840 | 150 | 32 | 350 |

TABLE 2-continued

| 23 |   | 860 | 550 | 55 | 820 | 40  | 49 | 360 |
|----|---|-----|-----|----|-----|-----|----|-----|
| 24 | G | 880 | 480 | 55 | 860 | 300 | 34 | 350 |
| 25 |   | 870 | 500 | 60 | 890 | 150 | 24 | 370 |
| 26 | H | 870 | 510 | 50 | 890 | 200 | 29 | 350 |
| 27 | I | 880 | 500 | 50 | 840 | 120 | 21 | 360 |
| 28 | J | 860 | 550 | 55 | 760 | 150 | <u>10</u> | 290 |
| 29 | K | 890 | 530 | 55 | 850 | 100 | 38 | 430 |
| 30 | L | 880 | 480 | 55 | 880 | 80  | 33 | 350 |
| 31 | M | 870 | 500 | 60 | 760 | 120 | 12 | 310 |
| 32 | N | 910 | 540 | 55 | 850 | 100 | 26 | 370 |
| 33 | O | 860 | 560 | 50 | 880 | 100 | 36 | 390 |
| 34 | P | 880 | 570 | 50 | 880 | 100 | 26 | 350 |
| 35 | Q | 890 | 520 | 50 | 900 | 100 | 37 | 380 |

| | Quenching and Tempering conditions | | | | | |
|---|---|---|---|---|---|---|
| Steel sheet No. | Cooling stop temperature (° C.) | Average cooling rate from Ms to cooling stop temperature (° C./s) | Tempering temperature (° C.) | Tempering holding time (s) | Coating conditions Coating treatment | Note |
| 1  | 220 | 3  | 400 | 30  | GA | Example |
| 2  | 240 | 4  | 360 | 50  | GA | Example |
| 3  | 220 | 6  | 480 | 70  | GI | Example |
| 4  | 200 | 4  | 410 | 100 | GI | Example |
| 5  | 150 | 8  | 380 | 150 | GA | Example |
| 6  | 210 | 9  | 400 | 200 | GA | Example |
| 7  | 190 | 4  | 440 | 40  | GA | Example |
| 8  | 230 | <u>15</u> | 370 | 50 | GI | Comparative Example |
| 9  | 220 | 5  | 400 | 30  | GA | Comparative Example |
| 10 | 160 | 7  | 420 | 90  | GI | Example |
| 11 | 190 | 5  | 390 | 40  | GA | Example |
| 12 | 200 | <u>18</u> | 450 | 60 | GI | Comparative Example |
| 13 | 190 | <u>14</u> | 400 | 50 | GA | Comparative Example |
| 14 | 240 | 8  | 410 | 90  | GA | Example |
| 15 | <u>180</u> | 6 | 470 | 250 | GA | Comparative Example |
| 16 | <u>160</u> | 8 | 400 | 30  | GA | Comparative Example |
| 17 | 180 | 5  | 400 | 50  | GA | Example |
| 18 | <u>270</u> | 9 | 380 | 40  | GA | Comparative Example |
| 19 | 200 | 6  | 400 | 30  | GA | Example |
| 20 | <u>150</u> | 8 | 320 | 30  | GI | Comparative Example |
| 21 | 160 | 9  | <u>280</u> | 60 | GA | Comparative Example |
| 22 | 150 | 4  | 410 | 40  | GA | Example |
| 23 | 190 | 5  | 400 | 360 | GI | Example |
| 24 | 170 | 6  | 360 | 60  | GA | Example |
| 25 | 240 | 8  | 320 | <u>15</u> | GA | Comparative Example |
| 26 | 150 | 7  | 450 | 100 | GA | Comparative Example |
| 27 | 240 | 5  | 450 | 60  | GI | Comparative Example |
| 28 | 220 | 9  | 410 | 30  | GA | Comparative Example |
| 29 | 250 | <u>21</u> | 380 | 190 | GA | Comparative Example |
| 30 | 200 | 8  | 480 | 120 | GI | Comparative Example |
| 31 | 200 | 7  | 460 | 30  | GA | Comparative Example |
| 32 | 200 | 7  | <u>510</u> | 30 | GA | Comparative Example |
| 33 | 200 | <u>12</u> | 400 | 80 | GA | Comparative Example |
| 34 | 160 | <u>14</u> | 400 | 70 | GA | Comparative Example |
| 35 | 170 | <u>18</u> | 380 | 50 | GA | Comparative Example |

Underlines indicate the outside of the scope of the invention

The resulting hot-dip galvanized steel sheet or galvannealed steel sheet was subjected to skin-pass rolling at a reduction of 0.3%. Subsequently, each area faction of ferrite (F), bainite (B), tempered martensite (TM), fresh martensite (FM), and retained austenite (RA) was obtained in accordance with the above-described method.

Moreover, tensile characteristics and fracture resistance characteristics were obtained in accordance with the following test methods.

<Tensile Test>

A JIS No. 5 tensile test piece (JIS Z 2201) was taken in a direction orthogonal to the rolling direction and subjected to a tensile test in accordance with the instructions in JIS Z 2241 at a strain rate of $10^-/s$ to obtain a tensile strength (TS). Herein, a TS of 980 MPa or more was regarded as satisfactory.

<Bending-Orthogonal Bending Test>

The bending test was performed under the following measurement conditions in accordance with the VDA standard (VDA 238-100) specified by the German Association of the Automotive Industry. A test piece was subjected, in advance, to primary bending using a 90 degree V-block under the following conditions. Fracture resistance characteristics were evaluated by assessing cracking during the deformation process in the portion that had been subjected to primary processing.

[Primary Bending Conditions]

Punch tip radius: 5 mm

Forming load: 15 ton

Stroke rate: 30 mm/min

Holding time: 5 seconds

Bending direction: direction parallel to rolling

[Orthogonal Bending Conditions]
Test method: roll support, punching
Roll diameter: Ø30 mm
Punch tip radium: 0.4 mm
Roll spacing: (sheet thickness×2)+0.5 mm
Stroke rate: 20 mm/min
Test piece size: 60 mm×60 mm
Bending direction: direction orthogonal to rolling A stroke from when a test piece flattens until the maximum load is reached was acquired in a stroke-load curve obtained during the orthogonal bending test, and an average for the bending-orthogonal bending test performed three times was denoted by ΔS. The point at which the test piece flattens is regarded as a point at which the load starts to increase again after becoming almost constant in the stroke-load curve. ΔS of 8 mm or more was evaluated as satisfactory fracture resistance characteristics.

The results are shown in Table 3.

TABLE 3

| Steel sheet No. | V(F) (%) | V(TM) (%) | V(FM) (%) | V(RA) (%) | Void number density (/mm²) | Tensile strength TS (MPa) | Fracture resistance characteristics ΔS (mm) | Note |
|---|---|---|---|---|---|---|---|---|
| 1 | 42 | 45 | 6 | 7 | 833 | 1098 | 12 | Example |
| 2 | 34 | 50 | 8 | 8 | 972 | 1156 | 11 | Example |
| 3 | 48 | 39 | 8 | 5 | 1389 | 1021 | 9 | Example |
| 4 | 49 | 41 | 4 | 6 | 972 | 1196 | 11 | Example |
| 5 | 53 | 42 | 3 | 2 | 1389 | 1113 | 8 | Example |
| 6 | 48 | 40 | 8 | 4 | 1250 | 1242 | 8 | Example |
| 7 | 43 | 48 | 6 | 3 | 694 | 1048 | 12 | Example |
| 8 | 37 | 49 | 6 | 8 | <u>2778</u> | 1124 | 7 | Comparative Example |
| 9 | 51 | <u>36</u> | 7 | 6 | 833 | 964 | 10 | Comparative Example |
| 10 | 50 | 43 | 3 | 4 | 1250 | 1101 | 10 | Example |
| 11 | 22 | 70 | 6 | 2 | 1389 | 1186 | 10 | Example |
| 12 | 26 | 63 | 5 | 6 | <u>1944</u> | 1182 | 7 | Comparative Example |
| 13 | 47 | 44 | 6 | 3 | <u>2222</u> | 1090 | 7 | Comparative Example |
| 14 | 45 | 41 | 8 | 6 | 1250 | 1222 | 10 | Example |
| 15 | <u>77</u> | <u>7</u> | <u>12</u> | 4 | 1111 | 974 | 11 | Comparative Example |
| 16 | <u>77</u> | <u>10</u> | <u>11</u> | 2 | <u>2917</u> | 1003 | 6 | Comparative Example |
| 17 | 46 | 44 | 6 | 4 | 1528 | 999 | 10 | Example |
| 18 | 42 | <u>31</u> | <u>19</u> | 8 | 3194 | 1043 | 5 | Comparative Example |
| 19 | 22 | 68 | 7 | 3 | 1111 | 1492 | 8 | Example |
| 20 | 34 | 43 | <u>17</u> | 6 | <u>3333</u> | 1336 | 6 | Comparative Example |
| 21 | 59 | <u>31</u> | 8 | 2 | <u>3056</u> | 1203 | 7 | Comparative Example |
| 22 | 32 | 60 | 5 | 3 | 1250 | 1192 | 10 | Example |
| 23 | 20 | 68 | 7 | 5 | 1111 | 1342 | 10 | Example |
| 24 | 32 | 59 | 6 | 3 | 1380 | 1326 | 9 | Example |
| 25 | 13 | 67 | <u>18</u> | 2 | <u>3194</u> | 1397 | 6 | Comparative Example |
| 26 | 16 | 65 | <u>14</u> | 5 | <u>3056</u> | 1244 | 7 | Comparative Example |
| 27 | <u>73</u> | <u>20</u> | 6 | 1 | 972 | 972 | 10 | Comparative Example |
| 28 | <u>64</u> | <u>18</u> | <u>13</u> | 5 | <u>3611</u> | 1107 | 5 | Comparative Example |
| 29 | 24 | 64 | <u>11</u> | 1 | <u>3194</u> | 861 | 6 | Comparative Example |
| 30 | 10 | 73 | <u>11</u> | 6 | <u>3056</u> | 1428 | 6 | Comparative Example |
| 31 | 58 | <u>29</u> | <u>12</u> | 1 | <u>3194</u> | 1251 | 6 | Comparative Example |
| 32 | 15 | 71 | <u>11</u> | 3 | <u>2778</u> | 1005 | 7 | Comparative Example |
| 33 | 36 | 56 | 5 | 3 | <u>1944</u> | 963 | 11 | Comparative Example |
| 34 | 29 | 62 | 8 | 1 | <u>2917</u> | 1272 | 7 | Comparative Example |
| 35 | 20 | 72 | 5 | 1 | <u>3194</u> | 1233 | 6 | Comparative Example |

Underlines indicate the outside of the scope of the invention
V(F): ferrite,
V(TM): tempered martensite,
V(FM): fresh martensite,
V(RA): retained austenite It is confirmed that all the Examples have a TS of 980 MPa or more and excellent fracture resistance characteristics in a crash.

As in the foregoing, according to aspects of the present invention, it is possible to obtain a high-strength hot-dip galvanized steel sheet having a TS of 980 MPa or more and excellent fracture resistance characteristics in a crash. Aspects of the present invention exerts excellent effects of contributing to the weight reduction of automobiles and greatly contributing to the higher performance of automotive bodies.

INDUSTRIAL APPLICABILITY

According to aspects of the present invention, it is possible to obtain a high-strength hot-dip galvanized steel sheet having a TS of 980 MPa or more and excellent fracture resistance characteristics in a crash. By using for automotive parts, the high-strength hot-dip galvanized steel sheet according to aspects of the present invention can contribute to the weight reduction of automobiles and greatly contribute to the higher performance of automotive bodies.

The invention claimed is:

1. A high-strength hot-dip galvanized steel sheet having a hot-dip galvanized coating layer on a surface of the steel sheet, the steel sheet comprising:
a steel composition containing, in mass %,
C: 0.07% to 0.20%,
Si: 0.1% to 2.0%,
Mn 2.0% to 3.5%,
P: 0.05% or less,
S: 0.05% or less, and
sol. Al: 0.005% to 0.1%, with the balance being Fe and incidental impurities; and a steel microstructure containing, in area fraction, 60% or less of ferrite, 40% or more of tempered martensite, and 10% or less of fresh martensite and having a void number density of 1,500/mm$^2$ or less in a bent portion in the VRA bending test.

2. The high-strength hot-dip galvanized steel sheet according to claim 1, wherein the steel microstructure further contains, in area fraction, 3% to 10% of retained austenite.

3. The high-strength hot-dip galvanized steel sheet according to claim 1, wherein the steel composition further contains, in mass %, at least one selected from the following groups A to C consisting of:
Group A: one or two or more elements selected from
Cr: 0.005% to 1.0%,
Mo: 0.005% to 0.5%, and
V: 0.005% to 0.5%;
Group B: one or two or ore elements selected from
Ti: 0.005% to 0.5%,
Nb: 0.005% to 0.5%,
B: 0.0003% to 0.005%,
Ni: 0.005% to 1.0%, and
Cu: 0.005% to 1.0%; and
Group C: one or two elements selected from
Ca: 0.001% to 0.005% and
REM: 0.001% to 0.005%.

4. The high-strength hot-dip galvanized steel sheet according to claim 2, wherein the steel composition further contains, in ma %, at least one selected from the following groups A to C consisting of:
Group A: one or two or more elements selected from
Cr: 0.005% to 1.0%,
Mo: 0.005% to 0.5%, and
V: 0.005% to 0.5%;
Group B: one or two or more elements selected from
Ti: 0.005% to 0.5%,
Nb: 0.005% to 0.5%,
B: 0.4443% to 0.005%,
Ni: 0.005% to 1.0%, and
Cu: 0.005% to 1.0%; and
Group C: one or two elements selected from
Ca: 0.001% to 0.005% and
REM: 0.001% to 0.005%.

5. The high-strength hot-dip galvanized steel sheet according to claim 1, wherein the hot-dip galvanized coating layer on the surface of the steel sheet is a galvannealed coating layer.

6. The high-strength hot-dip galvanized steel sheet according to claim 2, wherein the hot-dip galvanized coating layer on the surface of the steel sheet is a galvannealed coating layer.

7. The high-strength hot-dip galvanized steel sheet according to claim 3, wherein the hot-dip galvanized coating layer on the surface of the steel sheet is a galvannealed coating layer.

8. The high-strength hot-dip galvanized steel sheet according to claim 4, wherein the hot-dip galvanized coating layer on the surface of the steel sheet is a galvannealed coating layer.

9. A method of manufacturing a high-strength hot-dip galvanized steel sheet according to claim 1, comprising:
a hot rolling step of subjecting a steel slab having the steel composition according to claim 1 to hot rolling at a finish rolling temperature of 850° C. to 950° C. and coiling at a coiling temperature of 600° C. or lower;
a cold roiling step of cold rolling the hot-rolled steel sheet at a reduction exceeding 20%;
an annealing step of heating the cold-rolled steel sheet to an annealing temperature of 750° C. or higher and holding for 30 seconds or more;
subjecting the annealed steel sheet to a quenching and tempering step including cooling at an average cooling rate of 20° C./s or more in a temperature range from the annealing temperature to a martensite start temperature (Ms), cooling at an average cooling rate of 2° C./s to 10° C./s from Ms to a cooling stop temperature of (Ms-200° C.) to (Ms-100° C.), and then holding at 300° C. to 500° C. for 20 seconds or more; and
a hot-dip galvanizing step of subjecting the quenched and tempered steel sheet of hot-dip galvanizing.

10. A method of manufacturing a high-strength hot-dip galvanized steel sheet according to claim 3, comprising:
a hot rolling step of subjecting a steel slab having the steel composition according to claim 3 to hot rolling at a finish rolling temperature of 850° C. to 950° C. and coiling at a coiling temperature of 600° C. or lower;
a cold rolling step of cold rolling the hot-rolled steel sheet at a reduction exceeding 20%;
an annealing step of heating the cold-rolled steel sheet to an annealing temperature of 750° C. or higher and holding for 30 seconds or more;
subjecting the annealed steel sheet to a quenching and tempering step including cooling at an average cooling rate of 20° C./s or more in a temperature range from the annealing temperature to a martensite start temperature (Ms), cooling at an average cooling rate of 2° C./s to 10° C./s from Ms to a cooling stop temperature of (Ms-200° C.) to (Ms-100° C.), and then holding at 300° C. to 500° C. for 20 seconds or more; and
a hot-dip galvanizing step of subjecting the quenched and tempered steel sheet to hot-dip galvanizing.

11. The method of manufacturing a high-strength hot-dip galvanized steel sheet according to claim 9, wherein the hot-dip galvanizing step includes an alloying step of subjecting the galvanized steel sheet to an alloying treatment after subjecting to the hot-dip galvanizing.

12. The method of manufacturing a high-strength hot-dip galvanized steel sheet according to claim 10, wherein the hot-dip galvanizing step includes an alloying step of subjecting the galvanized steel sheet to an alloying treatment after subjecting to the hot-dip galvanizing.

\* \* \* \* \*

UNITED STATES PATENT AND TRADEMARK OFFICE
CERTIFICATE OF CORRECTION

PATENT NO. : 11,643,701 B2
APPLICATION NO. : 17/425096
DATED : May 9, 2023
INVENTOR(S) : Shinsuke Komine et al.

It is certified that error appears in the above-identified patent and that said Letters Patent is hereby corrected as shown below:

In the Claims

In Claim 1, Column 17, Line 5, "VRA" should read -- VDA --
In Claim 4, Column 17, Line 30, "ma" should read -- mass --
In Claim 4, Column 17, Line 39, "0.4443%" should read -- 0.0003% --

Signed and Sealed this
Fifth Day of September, 2023

Katherine Kelly Vidal
*Director of the United States Patent and Trademark Office*